United States Patent
Nelson (10) Patent No.: US 10,782,420 B2
(45) Date of Patent: Sep. 22, 2020

(54) RANGE-EXTENDED DOSIMETER

(71) Applicant: THERMO EBERLINE LLC, Oakwood Village, OH (US)

(72) Inventor: Greg Holger Nelson, Ithaca, NY (US)

(73) Assignee: THERMO EBERLINE LLC, Oakwood Village, OH (US)

( * ) Notice: Subject to any disclaimer, the term of this patent is extended or adjusted under 35 U.S.C. 154(b) by 0 days.

(21) Appl. No.: 16/215,797

(22) Filed: Dec. 11, 2018

(65) Prior Publication Data

US 2019/0187299 A1 Jun. 20, 2019

Related U.S. Application Data

(60) Provisional application No. 62/599,893, filed on Dec. 18, 2017.

(51) Int. Cl.
| | |
|---|---|
| *G01T 1/11* | (2006.01) |
| *G01T 1/115* | (2006.01) |
| *G01T 1/17* | (2006.01) |
| *G01T 1/02* | (2006.01) |

(52) U.S. Cl.
CPC .............. *G01T 1/115* (2013.01); *G01T 1/02* (2013.01); *G01T 1/17* (2013.01)

(58) Field of Classification Search
CPC .............. G01T 1/115; G01T 1/02; G01T 1/17
See application file for complete search history.

(56) References Cited

U.S. PATENT DOCUMENTS

| | | | |
|---|---|---|---|
| 4,788,581 A | 11/1988 | Knoll et al. | |
| 4,827,131 A | 5/1989 | Moscovitch | |
| 5,739,541 A | 4/1998 | Kahilainen | |
| 6,172,368 B1 | 1/2001 | Tarr et al. | |
| 6,815,983 B2 | 11/2004 | Owen | |
| 6,829,164 B2 | 12/2004 | Owen | |
| 6,898,123 B2 | 5/2005 | Owen | |
| 7,113,017 B2 | 9/2006 | Owen | |
| 7,345,522 B2 | 3/2008 | Owen | |
| 7,429,888 B2 | 9/2008 | Owen | |
| 7,432,744 B2 | 10/2008 | Owen | |
| 7,936,270 B2 | 5/2011 | Britton, Jr. et al. | |
| 8,519,345 B2 | 8/2013 | Arsalan et al. | |
| 8,841,622 B2 | 9/2014 | Kahilainen et al. | |
| 9,035,266 B2 | 5/2015 | Illemann et al. | |
| 9,151,848 B2 | 10/2015 | Kahilainen et al. | |

(Continued)

FOREIGN PATENT DOCUMENTS

EP 1588374 B1 9/2008

*Primary Examiner* — Hugh Maupin (74) *Attorney, Agent, or Firm* — William R. McCarthy, III (57) ABSTRACT

An embodiment of a dosimeter apparatus is described that comprises a first radiation sensor configured to measure high energy photons from a radiation field; a second radiation sensor configured to measure accumulated photons from the radiation field over a time interval; an interface; and a processor comprising executable code stored thereon, wherein the executable code: computes a high dose value for the high energy photons measured by the first radiation sensor; computes an event dose value of the photons accumulated over the time interval; determines a total dose value for the time interval that comprises the greater of the high dose value or the event dose value; and communicates the total dose value for the time interval to a user via the interface.

20 Claims, 4 Drawing Sheets

(56) References Cited

U.S. PATENT DOCUMENTS

| | | |
|---|---|---|
| 9,213,112 B2 | 12/2015 | Stubbers et al. |
| 9,468,406 B2 | 10/2016 | Dieckmann et al. |
| 2006/0017009 A1* | 1/2006 | Rink .......................... G01T 1/04 |
| | | 250/484.5 |
| 2009/0015320 A1 | 1/2009 | Owen |
| 2009/0039279 A1 | 2/2009 | Fehrenbacher et al. |
| 2013/0320212 A1* | 12/2013 | Valentino .............. G01J 1/0488 |
| | | 250/336.1 |

* cited by examiner

RANGE-EXTENDED DOSIMETER

CROSS-REFERENCE TO RELATED APPLICATION

This application claims the benefit of U.S. provisional patent application No. 62/599,893, filed Dec. 18, 2017. The content of this application is incorporated by reference in its entirety.

FIELD OF THE INVENTION

The present invention is generally directed to devices and methods for a dual sensor radiation dosimeter enabled to provide accurate measurement and reporting of high and pulsed radiation fields as well as accumulated radiation dose.

BACKGROUND

The term "radiation dosimeter" as used herein generally refers to devices that measure exposure to ionizing radiation and play vital role for workers in certain industries where there is routine radiation exposure. It is important for these workers to monitor the cumulative dose over time to ensure that their exposure does not exceed safe levels. There are a number of types of radiation dosimeters available that fall into two general classes. The first class is referred to as a "passive" dosimeter that is sensitive to ionizing radiation and records a value of cumulative radiation dose (also sometimes referred to in a biological context as an "effective dose" or "equivalent dose" value that may be measured in units including "sieverts" (e.g. Sv) or in a physical context that may be measured in units including "grays" (e.g. Gy)). Typical embodiments of passive dosimeter do not have the capability to actively communicate the dose value to the user. The second class of dosimeter is referred to as an "active" dosimeter, which may continuously measure and provide a communication reporting the dose value to the user. Because it is monitoring the dose value in real-time, it can also provide a dose rate (e.g. Sv/h) that cannot be provided by a passive dosimeter. Also, many embodiments of active dosimeter typically include an alarm function that provides the user with an audible and/or visual indication that a threshold dose or dose rate value has been reached. Similarly, many embodiments of active dosimeter typically include a record of dose history that provides the user with an indication of the dose received as a function of time.

Active dosimetry for ionizing radiation has traditionally focused on measurements of what is referred to as a "personal dose equivalent". The term "personal dose equivalent" as used herein generally refers to a quantity of ionizing radiation representing a safety threshold for exposure recommended by the International Commission on Radiation Units and Measurements (ICRU) for the dose equivalent in tissue at depth (d) below a specified point on the body. Examples of personal dose equivalents include a deep dose (e.g. for thoracic exposure) equivalent safety threshold value referred to as $H_p(10)$, an eye dose equivalent safety threshold value referred to as $H_p(3)$, and a surface dose (e.g. for skin exposure) equivalent safety threshold value of about $H_p(0.07)$. Those of ordinary skill in the related art appreciate that it is advantageous to monitor dose equivalent values for personnel who may be routinely exposed as part of their profession, such as for example personnel who work in the fields of interventional radiology and cardiology as well as the nuclear power and aviation industries.

Passive dosimetry devices, such as for example thermoluminescent dosimeters (TLD) are sometimes referred to as "integrating dosimeters" and have historically been used to monitor exposure to radiation. Typical embodiments of integrating dosimeter devices provide a one-time cumulative reading of exposure that represents the dose received over an extended period of time. In some cases the exposure reading is provided weeks or months after the actual exposure to the ionizing radiation. True active dosimetry provides a significant benefit over this kind of passive dosimetry because users can be informed in "real-time" when they have entered a radiation field that may pose a danger to the user, thus providing the user with the opportunity to remove themselves from harm's way. The term "real-time" as used herein typically refers to reporting, depicting, or reacting to events at the same rate and sometimes at the same time as they unfold (e.g. within a few seconds or fractions of a second) rather than delaying a report or action. An additional example of TLD dosimeter is described in U.S. Pat. No. 4,827,131, titled "TLD apparatus and method with elapsed time read-out capability", which is hereby incorporated by reference herein in its entirety for all purposes.

Currently available active dosimeters typically include what is referred to as "event counting" technology. For example, in a typical embodiment of an event counting device photons of radiation are detected over a period of time and processed into a signal. If that signal matches appropriate parameters (e.g. amplitude, shape, etc.) it is counted as an event (also referred to as a "count") that corresponds to an increment of dose. Thus event counting devices are able to provide real-time alerts (e.g. audible alarms, visual alarms, or tactile vibration alarms) when the count rate is high, or even when the accumulated counts reach some preset level. In the present example, the counts are collected and one or more dose equivalents are computed and displayed from these counts.

Currently available event counting active dosimeters, however, are known to have limited performance with respect to radiation fields that are very strong (sometimes referred to as "high fields" or "high intensity fields") which exceed the detection range of detection elements employed with event counting active dosimeters. For example, event counting active dosimeters may include detection elements such as one or more sensors, signal processors, and/or counting electronics that generally operate linearly. This can lead to missed event counts (sometimes referred to as "dead time"), and in some situations high fields can lead to saturation of one or more detection elements where the count rate drops even as the field strength increases (sometimes referred to as "fold over"). In the present example, a limit of the detection range of current event counting active dosimeters may be evidenced by a drop in the count rate at a dose level above about 10,000 photons/second associated with a high intensity field strength of about 10 Sv/h.

In addition, currently available event counting devices are only enabled to provide an average rate of the photons detected over a specified interval of time (e.g. one second). It is appreciated that high intensity fields can exhibit significantly shorter durations of time than the specified interval that an event counting device is capable of measuring (e.g. over one microsecond or one millisecond). These ultra-short duration events are typically referred to as "pulsed fields" that are not accurately measureable by currently available active dosimeters and present a significant problem for users exposed to them. For example, this is increasingly important due to the growing use of pulsed fields in linear accelerators (LINACs), as well as high-speed X-ray imaging in medical and non-destructive test (NDT) applications. It is generally appreciated that each produce pulsed fields that need to be accurately measured for the safety of personnel who are at risk of exposure.

Further, some event counting active dosimeters may be able to address a partial range of pulsed field but can only do so with certain costs. For example, some embodiments of event counting active dosimeter can address a limited range of high pulse frequencies (e.g. 10 Hz to 400 Hz) by implementing what may be referred to as a "fast sampling" approach that also introduces noise into the detected signal and consumes power at a high rate. It is also appreciated that fast sampling is impractical for measurement of fields with high pulse frequencies (e.g. 10 kHz or higher) or fields with narrow pulses (e.g. 10-50 ns) due, inter alia, to saturation of the sensor.

Therefore, there is a need for a system and method that achieves both the real-time responsiveness of active dosimetry, while at the same time achieving accurate performance in high field and pulsed field conditions. Further, there is a need that the system and method should also meet the constraints of being low-power and portable in order to be readily applicable to personnel dosimetry.

SUMMARY

Systems, methods, and products to address these and other needs are described herein with respect to illustrative, non-limiting, implementations. Various alternatives, modifications and equivalents are possible.

An embodiment of a dosimeter apparatus is described that comprises a first radiation sensor configured to measure high energy photons from a radiation field; a second radiation sensor configured to measure accumulated photons from the radiation field over a time interval; an interface; and a processor comprising executable code stored thereon, wherein the executable code: computes a high dose value for the high energy photons measured by the first radiation sensor; computes an event dose value of the photons accumulated over the time interval; determines a total dose value for the time interval that comprises the greater of the high dose value or the event dose value; and communicates the total dose value for the time interval to a user via the interface.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 100 appears first in FIG. 1). All of these conventions, however, are intended to be typical or illustrative, rather than limiting.

Like reference numerals refer to corresponding parts throughout the several views of the drawings.

DETAILED DESCRIPTION OF EMBODIMENTS

As will be described in greater detail below, embodiments of the described invention includes an active dosimeter that comprises an event counting sensor as well as a high intensity sensor that each detect a type of radiation energy and provide signals that synergistically provide a complete measure of radiation dose exposure. More specifically, the described embodiments include a dosimeter with an event counting sensor that provides good temporal energy response and a high intensity sensor that provides good sensitivity across a wide range of energies.

Figure 1:
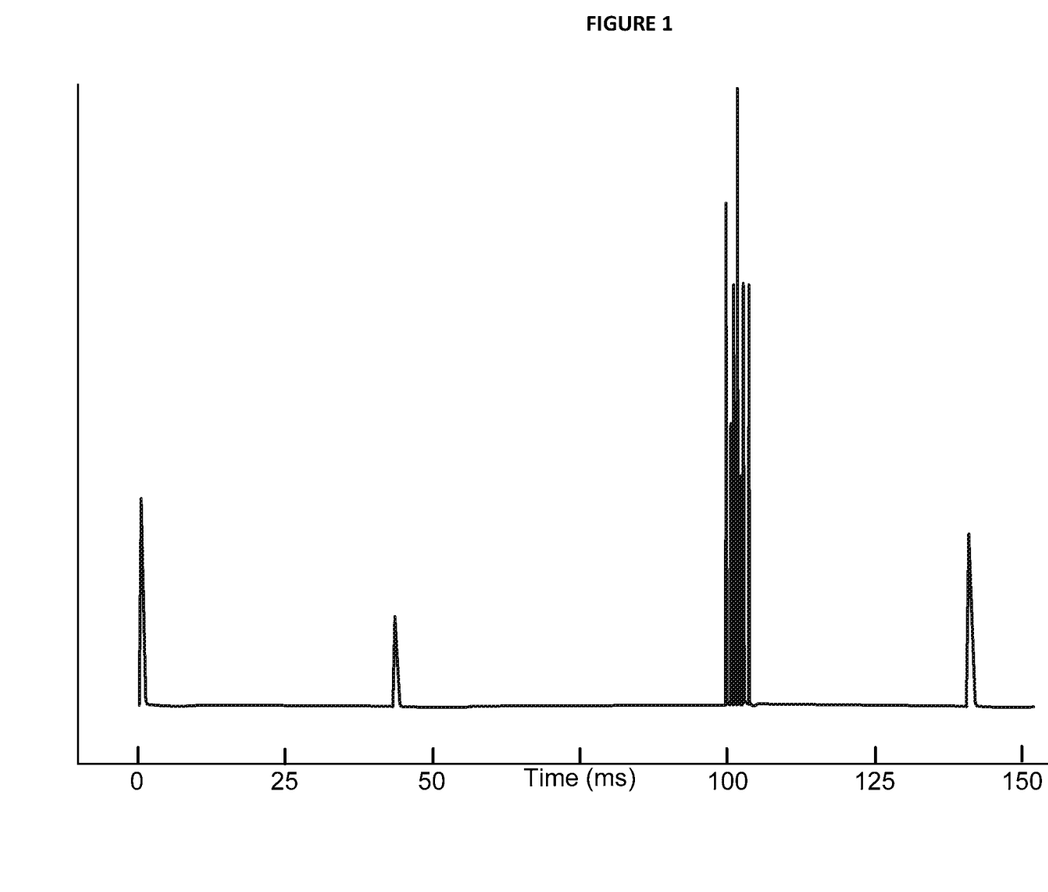
FIG. 1 is a graph of one embodiment of a simulation comprising signal intensity as a function of elapsed time that illustrates a 5 ms burst of 1,600 counts per second (cps) in a background of 25 cps.

FIG. 1 provides an illustrative example that demonstrates a simulated measurement of a pulsed field where the count rate rapidly spikes from a low "background" rate to a high "pulse" rate over a very short duration of time. As shown in FIG. 1, a burst of detected radiation spikes from a background level of about 25 counts per second (cps) to as high as about 1,600 cps over a 5 millisecond (ms) time period starting at an elapsed time of 100 ms. Although individual photons would be successfully counted for the events at 0 ms, 43 ms, and 140 ms, the roughly 8 counts expected in the burst are so close together that they may be superimposed or not otherwise resolvable in time. The example illustrated in FIG. 1 is representative of photons emitted in bursts by LINAC sources for nuclear medicine or the X-ray sources used in $ND_T$ applications that include pulses that change count rate by several orders of magnitude almost instantaneously (nanoseconds). As described above, typical active dosimeters under-report these kinds of fields even though the average dose rate over a period is well within the bounds the device is configured to measure. Such high variability can compromise algorithms responsible for dead-time correction, and worse yet the measurement electronics itself may substantially saturate leading to few or no counts being measured during pulse intervals.

Figure 2:
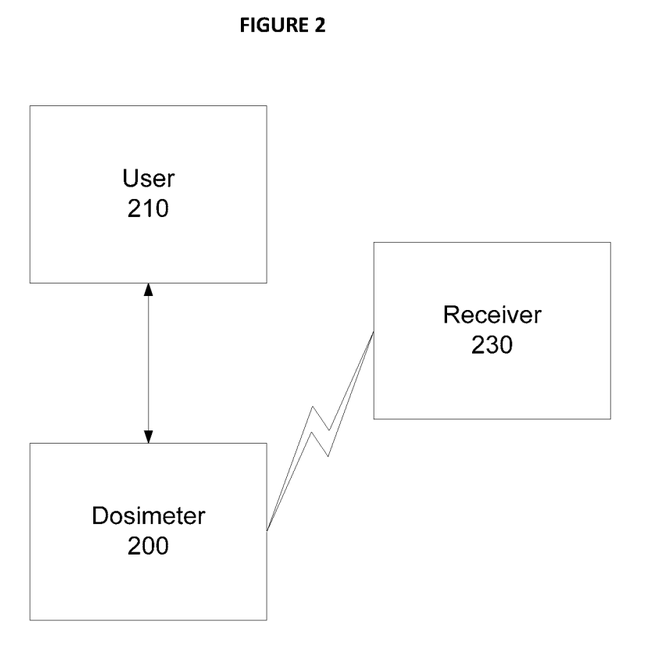
FIG. 2 is a simplified graphical representation of one embodiment of an active dosimeter wearable by a user and a receiver.

FIG. 2 provides a simplified illustrative example of dosimeter 200 that is worn by or in close proximity to user 210. FIG. 2 also illustrates receiver 230 that receives one or more wireless communications from dosimeter 200 and provides user 210 with real-time information on radiation dose detected by dosimeter 200 based on the communications received. In the described embodiments, receiver 230 may include a smart phone, tablet, other general purpose wireless-capable device, or any receiver type device known in the field of active dosimetry. The term "close proximity" as used herein in reference to the spatial relationship between dosimeter 200 and user 210 generally refers to a location within a range where user 210 can unambiguously identify a signal from dosimeter 200 and respond accordingly. For example, an acceptable range may depend on the type and/or intensity of signal or combination of signals provided by dosimeter 200 such as audible, visual, or mechanical (e.g. vibration) signals.

Also in some embodiments, dosimeter 200 may be configured to engage with a central base station when not in use by user 210. Embodiments of the central base station may provide charging capability for dosimeter 200 as well as a network connection that provides the capability for dosimeter 200 to transmit data to other computing devices via the network and/or receive information such as software updates, detection parameters, security identifiers, etc. Further, some or all embodiments of a central base station may include a processor or microprocessor as well as data storage elements that may be particularly useful if a consistent network connection is not available.

Figure 3:
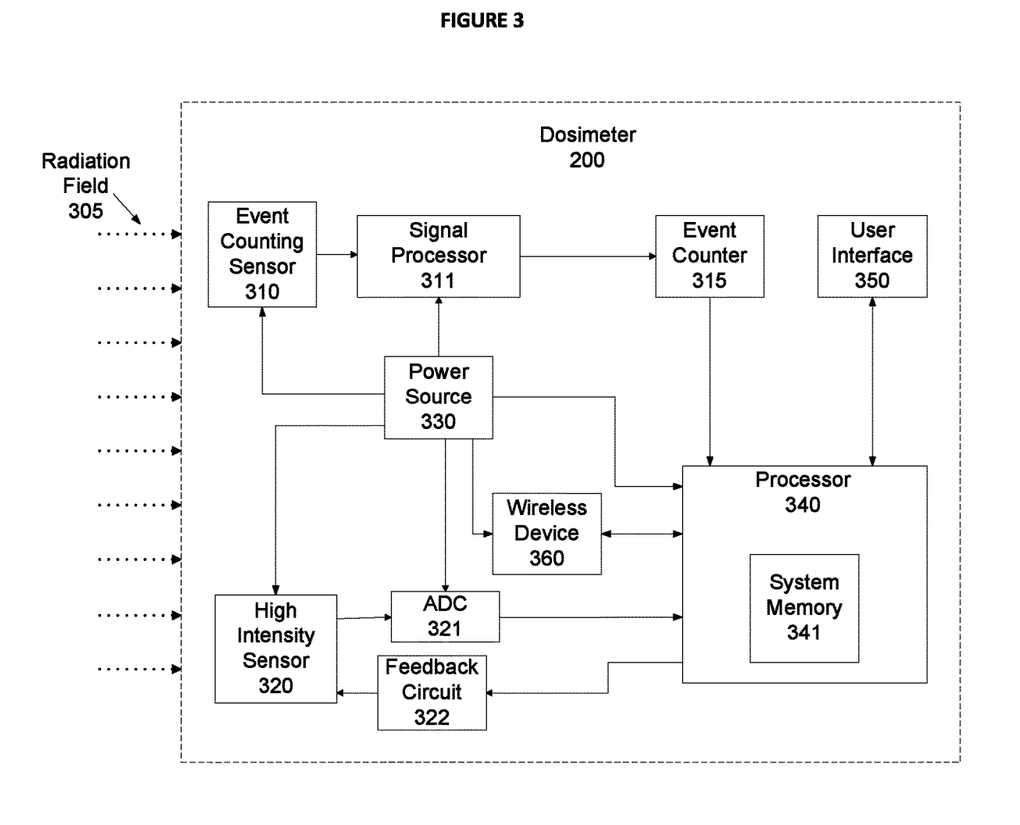
FIG. 3 is a simplified graphical representation of one embodiment of the active dosimeter of FIG. 2 incorporating two sensor an event counting sensor and a high intensity sensor.

An exemplary embodiment of dosimeter 200 capable of providing temporal measurement coupled with high and pulse field measurement is shown in FIG. 3 that includes at least two sensor types, event counting sensor 310 and high intensity sensor 320 both of which are enabled to measure particular aspects of radiation field 305 in a complementary fashion. FIG. 3 also illustrates additional components configured to operate with event counting sensor 310 and high intensity sensor 320. For example, signal processor 311 receives the output from event counting sensor 310, determines the occurrence of an event detected from the measured radiation, and provides the event to event counter 315. Event counter 315 integrates the number of events detected over a period of time (e.g. 1 second) and communicates a measure such as count rate to processor 340 (e.g. an average of detection events over a unit of time such as counts per second "cps").

Also, dosimeter 200 comprises an analog to digital converter illustrated as ADC 321 that receives the output from high intensity sensor 320 and provides a digital value representing detected high field and/or pulse field events to processor 340. Further, feedback circuit 322 modulates the output of high intensity sensor 320. For example, feedback circuit 322 typically modulates operations that include reset, calibration, temperature compensation, and/or adjustment of the analog output of high intensity sensor 320. This results in a more meaningful and correct output of a digitized value from high intensity sensor 320.

It will be appreciated that one or more elements which may include event counter 315, ADC 321, and feedback circuit 322 might be implemented as aspects of processor 340, or combined with each other into one or more distinct elements. Therefore the embodiment illustrated in FIG. 3 should not be considered as limiting.

Also, various components of dosimeter 200 receive power from power source 330 which may include one or more batteries that in some embodiments may be rechargeable. Likewise user interface 350 may include a display (e.g. liquid crystal display, touch screen comprising a graphical user interface (GUI), or other type of display interface known in the related art), one or more buttons, speaker interface for audible communication (e.g. an alert message or alarm), one or more visual alarm indicators, and/or tactile alarm indicators.

Also in the example of FIG. 3, processor 340 may comprise one or more processors and/or microprocessors coupled with system memory 341 that comprises one or more data storage elements that may include solid state storage technologies known in the related art. In the described embodiments, processor 340 employs control logic (e.g. software program, including program code) stored in system memory 341. The control logic, when executed by processor 340, causes the processor to perform functions described herein. For example, processor 340 implements software that executes a processing algorithm that receives inputs from event counter 315 and ADC 321, provides control information for feedback circuit 322, and sends and receives information to user interface 350.

FIG. 3 further illustrates an embodiment of wireless device 360 that may include a radio element and wireless antenna. Wireless device 360 may communicate with receiver 130 via any wireless technology known to those of ordinary skill in the related art and may depend, at least in part, on various criteria. The criteria may include, but is not limited to, range of transmission, data security, power requirements, physical dimension of radio and/or antenna, 1-way or 2-way communication, or other criteria. For example, direct device to device communication can be achieved using what is generally referred to as "Bluetooth" technology that has become a standard for exchanging data over short distances using short-wavelength UHF radio waves. Alternatively, wireless device 360 may communicate with receiver 130 via an intermediate. Some examples of communication intermediate using intermediate devices include what is referred to as Wi-Fi that communicates via wireless router devices and cellular based communications that utilize cellular communication points supported by a telecommunications provider (e.g. a text based standard for communication (also referred to as "short message service" (SMS)).

In the described embodiments, event counting sensor 310 may include any type of event counting sensor known in the art of active dosimetry. For example, event counting sensor 310 may be enabled to detect one or more of gamma radiation, beta radiation, neutron radiation, and x-ray-radiation. The specific sensor technology may depend, at least in part, on the type(s) of radiation that the embodiment of dosimeter 200 is designed to measure. In the present example, some embodiments may include what is referred to as a photodiode which may include a "PIN diode detector" capable of measuring at least gamma radiation and x-ray radiation.

Also, it will be appreciated that embodiments of the described dual sensor dosimeter enabled to detect in radiation in real time as well as high intensity and/or pulsed events should be cost-effective in order to be marketable. Consequently, the cost of including high intensity sensor 320 and supporting elements should not significantly increase the cost of the instrument. For example, introducing a custom fabricated Application Specific Integrated Circuit (ASIC) that comprises the high intensity sensor could make implementation prohibitively expensive.

One example of a cost effective solution includes what is referred to as analog floating gate technology that can be found in low cost commercially available integrated circuits. Analog floating gate devices comprise a number of advantageous features for implementation in a dosimeter device such as temperature compensation capabilities that enable accurate operation over a wide range of temperature. For example a temperature range may include a range of about −40° C. to +85° C. Importantly, an embodiment of high intensity sensor 320 that comprises an analog floating gate provides a complementary function to the real-time response provided by event counting sensor 310 by providing the high field and pulsed field performance at a minimal additional cost for the dosimeter.

For example, high intensity sensor 320 may include an ISL21080 "NanoPower Voltage Reference" (available from Intersil Americas LLC) that comprises an analog floating gate, is compact, low cost, and provides a factory-stabilized voltage output that can readily be measured. In the present example, high intensity sensor 320 detects high and pulsed fields across a wide range of energies and produces signals that can be processed by ADC 321 to digital events used to synergistically fill gaps in the temporal radiation measurements not provided by event counting sensor 310. Further, desirable embodiments may include a detection range of energy may include a range of about 50-1500 keV, however some embodiments may include a wider detection range of about 15-4000 keV that may be more desirable.

Figure 4:
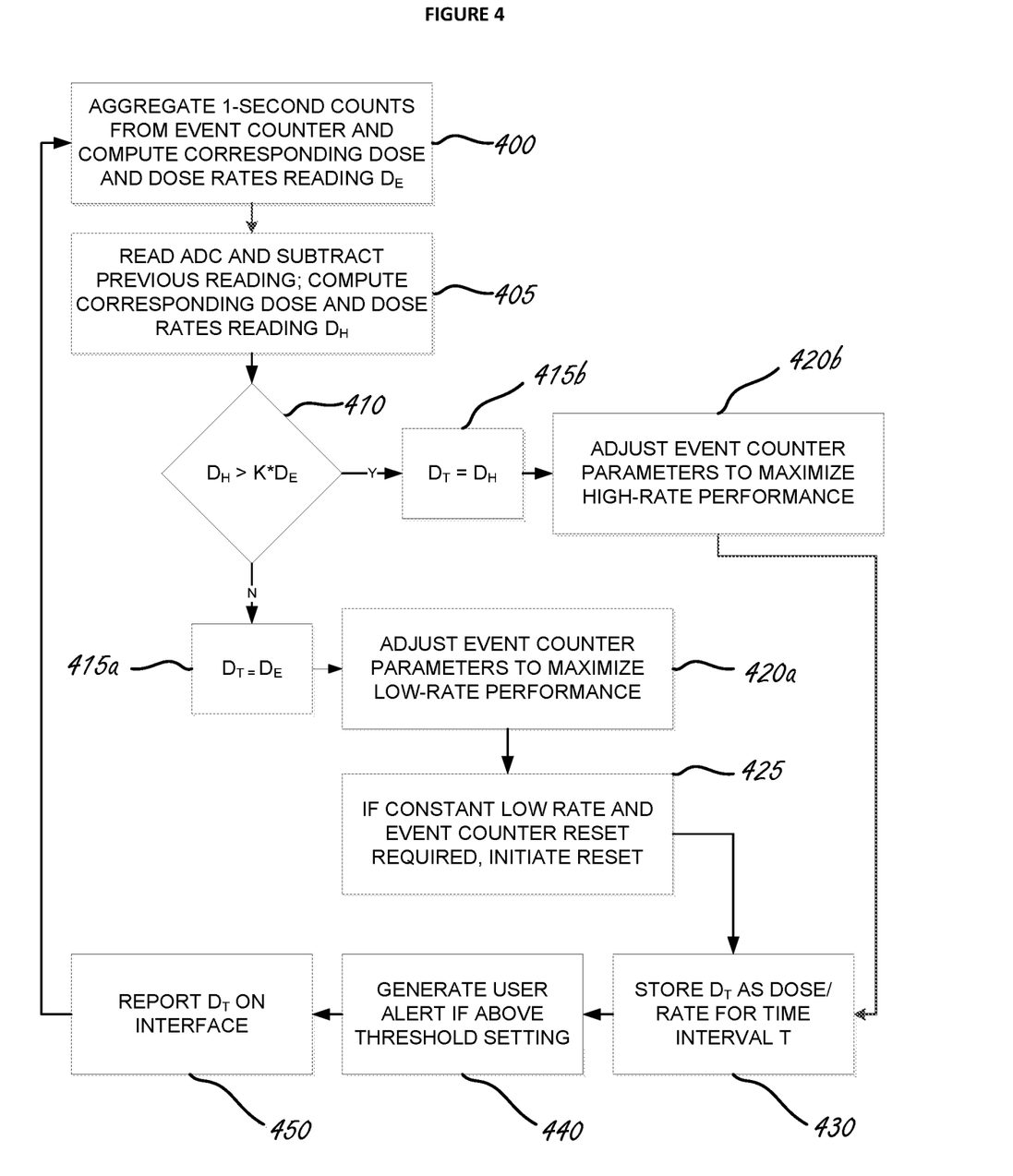
FIG. 4 is a simplified graphical representation of one embodiment of a flowchart illustrating a method for combining measurements provided by the event counting sensor and the high intensity sensor of FIG. 3 into a single dose measurement.

FIG. 4 illustrates a flowchart of an exemplary method performed by the processing algorithm used to integrate the signals from the event counting sensor 310 and high intensity sensor 320. In step 400, processor 340 receives the counts from event counter 315 as described above and calculates accumulated dose and dose rates $D_E$. For example, processor 340 may aggregate the count rates over a time interval (T) that includes a series of count rates detected from 1 second time periods. Processor 340, may then compute the accumulated dose as well as the dose rate received over time interval T.

In step 405, processor 340 receives digital events from ADC 321 as described above and calculates a set of measurements for accumulated dose and dose rates $D_H$. For example, processor 340 may subtract the measurements for accumulated dose and/or dose rates $D_H$ from a previous time interval T from the measurements for accumulated dose and/or dose rates $D_H$ for the current time interval T. Processor 340 may then assign the resulting value as the accumulated dose and dose rates $D_H$ values of the current time interval T.

In decision element 410, processor 340 compares $D_H$ and $D_E$, where $D_E$ is multiplied by a threshold value K which is typically greater than 1, for example 1.10, 1.15, 1.25, or another value. In cases where $D_H > K^* D_E$ is false (e.g. $K^* D_E$ matches or exceeds $D_H$) processor 340 assigns the time interval measurement $D_T$ as the measurement of $D_E$ as illustrated step 415a. In some embodiments, processor 340 also adjusts the performance of event counter 315 to improve low-rate performance as illustrated in step 420a. For example, the event integrating time interval may be adjusted from a long time period (e.g. about 1 second) to a short time period (e.g. about 1 millisecond) when the $D_H$ value indicates the likely presence of a pulsed field. In the present example, if the event count rate has remained low for an extended time, such as one hour, and the reading from ADC 321 exceeds a reference value showing that high intensity sensor 320 needs to be reset, processor 340 may initiate a reset using feedback circuit 322 as illustrated in step 425.

Alternately, in cases where $D_H > K^* D_E$ is true (e.g. $D_H$ exceeds $K^* D_E$), then processor 340 assigns the time interval measurement $D_T$ as the measurement of $D_H$ as illustrated in step 415b. Similarly, in some embodiments processor 340 may adjust event counter 315 for high rate performance as illustrated in step 420b. For example, processor 340 may adjust the event integrating time interval to a shorter event counting time interval (e.g. so that dead-time correction is more accurate) or an adjustment to another parameter, such as filter shape. Those of ordinary skill in the related art will appreciate that the examples presented herein are for the purposes of illustration and are not intended to be limiting.

In both cases, the processor 340 stores measurement $D_T$ in system memory 341 as the accumulated dose and dose rate for the present time interval T in step 430. Then in step 440, if the accumulated dose or dose rate exceeds a threshold setting, for example a maximum exposure or a maximum rate determined by either a regulatory body or the health physicist in charge of a facility, then the processor 340 may alert the user through the interface 350, for example by illuminating an alarm LED, by sounding a tone on a speaker (e.g. a piezo speaker), or by activating a tactile vibration device. In addition, processor 340 may report the values of measurement $D_T$ through interface 350, such as the presentation of numerical values on an LCD display that the user may read, or through a communications interface to another device.

In some embodiments of the invention, step 405 may also comprise aspects of the computation of $D_H$ that reflect the known characteristics of pulsed mode dose exposure, such as the energy of the pulsed mode source used at a particular site. In some embodiments of the invention, step 405 may also comprise aspects that reflect the prevailing characteristics of dose exposure measured by event counting sensor 310. In this way, accurate dose measurements $D_H$ may be generated over a larger range of potential energies and operating environments, without the use of multiple implementations of event counting sensor 310. However, in some embodiments of the invention, multiple implementations of event counting sensor 310 may also be used. For example, some embodiments may include one implementation of sensor 310 and one implementation of sensor 320, that may be useful in situations where information about the field properties is known a priori (e.g. that the pulsed field is generated by an 80 kV X-ray tube). Alternatively, a plurality of sensors 310 may be implemented with one implementation of sensor 320, which may be useful in situations where information about the field properties is calculated in situ by using the more informative measurement capabilities of multiple sensors.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments.

What is claimed is:

1. A dosimeter apparatus, comprising:
    a first radiation sensor configured to measure a pulse comprising high energy photons emitted in a short duration burst with a high pulse frequency of at least 10 Hz from a radiation field;
    a second radiation sensor configured to measure photons of one or more of gamma, beta, neutron, and x-ray radiation from the radiation field;
    an event counter configured to integrate a number of events from the photons measured over a time period by the second radiation sensor to produce a count rate value;
    an interface; and
    a processor configured to receive the count rate value from the event counter and comprising executable code stored thereon, wherein the executable code:

computes a high dose value for the high energy photons measured by the first radiation sensor;

computes an event dose value comprising an aggregate of a plurality of the count rate values over a time interval that includes a plurality of the time periods;

determines a total dose value for the time interval that comprises the greater of the high dose value or the event dose value, wherein when the total dose value comprises the high dose value then the processor adjusts one or more parameters to maximize high dose rate performance; and communicates the total dose value for the time interval to a user via the interface.

2. The dosimeter apparatus of claim 1, wherein:
the processor computes the high dose value by subtracting a measurement of the high energy photons from a previous time interval from a measurement of the high energy photons for a current time interval.

3. The dosimeter apparatus of claim 1, wherein:
the processor computes the event dose value by multiplying the aggregate of the plurality of the count rate values by a constant value.

4. The dosimeter apparatus of claim 3, wherein:
the constant value is greater than 1.

5. The dosimeter apparatus of claim 1, wherein:
the first sensor comprises a CMOS integrated circuit utilizing one or more Analog Floating Gates.

6. The dosimeter apparatus of claim 5, wherein:
the CMOS integrated circuit comprises a micropower voltage regulator with a change in voltage output proportional to an accumulated dose of the high energy photons.

7. The dosimeter apparatus of claim 5, further comprising:
an analog-to-digital converter (ADC) configured to read the voltage of the voltage regulator.

8. The dosimeter apparatus of claim 5, wherein:
the processor adjusts one or more parameters of the voltage regulator.

9. The dosimeter apparatus of claim 1, wherein:
the second sensor comprises a photodiode.

10. The dosimeter apparatus of claim 1, wherein:
the interface comprises a display.

11. The dosimeter apparatus of claim 1, further comprising:
a wireless communications device.

12. The dosimeter apparatus of claim 1, further comprising:
a housing configured in a wearable form by a user.

13. The dosimeter apparatus of claim 1, wherein:
the processor shortens the time period to integrate the number of events by the event counter to maximize high dose rate performance.

14. The dosimeter apparatus of claim 1, wherein:
when the total dose value comprises the event dose value then the processor adjusts one or more parameters of the event counter to maximize low dose rate performance.

15. The method of claim 1, wherein:
when the total dose value comprises the event dose value then one or more parameters are adjusted to maximize low dose rate performance.

16. A method for dose measurement, comprising:
measuring a pulse comprising high energy photons emitted in a short duration burst with a high pulse frequency of at least 10 Hz from a radiation field using a first radiation sensor;

measuring photons of one or more of gamma, beta, neutron, and x-ray radiation from the radiation field using a second radiation sensor;

integrating a number of events from the photons measured over a time period by the second radiation sensor to produce a count rate;

computing a high dose value for high energy photons;

computing an event dose value comprising an aggregate of a plurality of the count rate values over a time interval that includes a plurality of the time periods;

determining a total dose value for the time interval that comprises the greater of the high dose value or the event dose value, wherein when the total dose value comprises the high dose value then one or more parameters are adjusted to maximize high dose rate performance; and communicating the total dose value for the time interval to a user via an interface.

17. The method of claim 16, wherein:
the high dose value is computed by subtracting a measurement of the high energy photons from a previous time interval from a measurement of the high energy photons for a current time interval.

18. The method of claim 16, wherein:
the event dose value is computed by multiplying the aggregate of the plurality of the count rate values by a constant value.

19. The method of claim 18, wherein:
the constant value is greater than 1.

20. The dosimeter apparatus of claim 16, wherein:
the time period is shortened to integrate the number of events by the event counter to maximize high dose rate performance.

* * * * *